United States Patent [19]

Ohuchi et al.

[11] Patent Number: 5,090,607

[45] Date of Patent: Feb. 25, 1992

[54] FEED BELT FOR RIVETS

[75] Inventors: Masatoshi Ohuchi, Kooriyama; Masaru Matsumoto, Machida, both of Japan

[73] Assignee: OPT Engineering Co., Ltd., Kooriyama, Japan

[21] Appl. No.: 557,769

[22] Filed: Jul. 26, 1990

[30] Foreign Application Priority Data

Jul. 28, 1989 [JP] Japan .............................. 1-88994[U]

[51] Int. Cl.$^5$ .......................... B65D 85/24; B25C 5/02
[52] U.S. Cl. .................................... 227/136; 227/55; 206/345; 206/346; 206/347
[58] Field of Search .............. 206/338, 343, 345, 346, 206/347; 227/136, 55

[56] References Cited

U.S. PATENT DOCUMENTS

| | | | |
|---|---|---|---|
| 159,777 | 2/1875 | Sturtevant | 206/345 |
| 3,167,778 | 2/1965 | Decot et al. | 206/345 |
| 4,606,455 | 8/1986 | Grikis et al. | 206/347 |
| 4,913,611 | 4/1990 | Leistner | 206/345 |

Primary Examiner—William I. Price
Attorney, Agent, or Firm—Fleit, Jacobson, Cohn, Price, Holman & Stern

[57] ABSTRACT

A blind rivet feed belt for a continuous riveter wherein a series of supporting means for rivet rods is formed on a plastic channel, plastic belts or metallic chains, a series of driven means for advancing said belt and a series of blind rivets inserted in said feed belt.

4 Claims, 5 Drawing Sheets

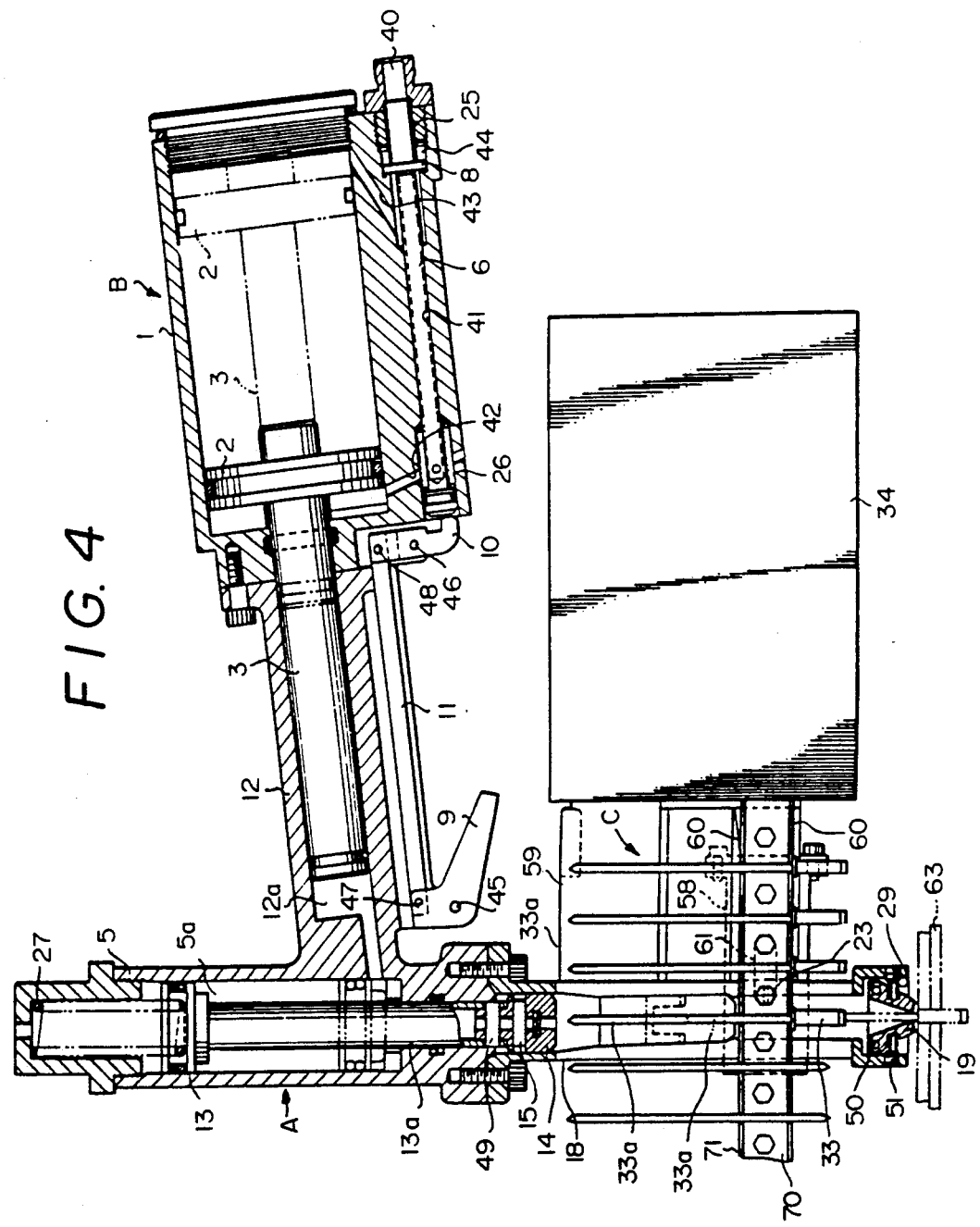

FEED BELT FOR RIVETS

BACKGROUND OF THE INVENTION

The present invention relates to a feed belt for rivets to be used in continuous riveter.

In a conventional riveter, for example, disclosed by the Japanese Patent Application Laid-open No. 61-78526, it is necessary to feed rivets one by one through a nose piece of riveter and take the remaining rods one by one out of an upper portion of the riveter.

Accordingly it is troublesome to load rivets each time and it causes a drop of productivity.

Considering the above situation, a continuous feed belt for rivets was developed wherein a series of blind rivets can be loaded into the determined position in the riveter.

The present invention provides a feed belt for rivets to be used in a continuous riveter.

SUMMARY OF THE INVENTION

A feed belt for rivets according to the present invention comprises a feed belt made of plastic material in channel form wherein a series of slits are formed on edges thereof at a determined distance so as to receive blind rivets transversely or diagonally parallel, a pair of feed belts made of plastic material in parallel wherein a series of through holes are formed so as to receive blind rivets transversely or diagonally parallel, or a pair of belts made of wire in parallel so as to receive blind rivets.

Blind rivets can be loaded automatically or intermittently when this rivet feed belt is used on a continuous riveter.

BRIEF DESCRIPTION OF THE DRAWINGS

FIG. 1 (b) shows a sectional view.

FIG. 1 (c) shows a lateral view.

FIG. 1 (d) shows a plan view of an other embodiment.

FIG. 2 (b) shows a sectional view.

FIG. 2 (c) shows a lateral view.

FIG. 3 (b) shows a sectional view.

FIG. 3 (c) shows a lateral view.

FIG. 4 shows a lateral sectional view of an embodiment applied on a riveter.

DETAILED DESCRIPTION OF THE PREFERRED EMBODIMENT

Figure 1A:
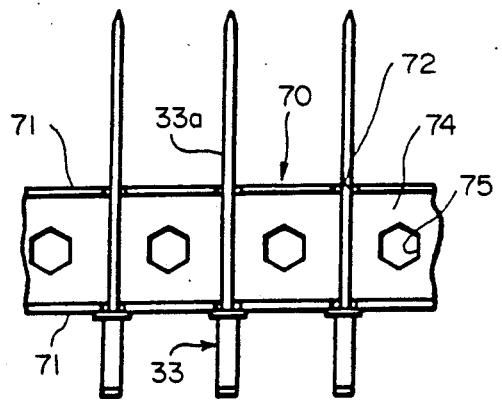
FIG. 1 (a) shows a plan view of an embodiment according to the present invention.
Figure 1B:
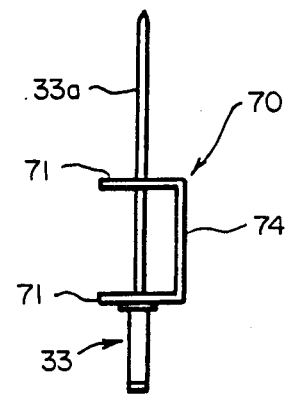
Figure 1C:
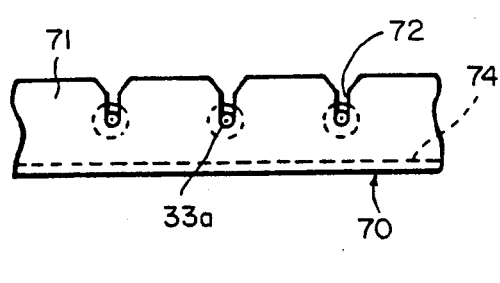
Figure 1D:
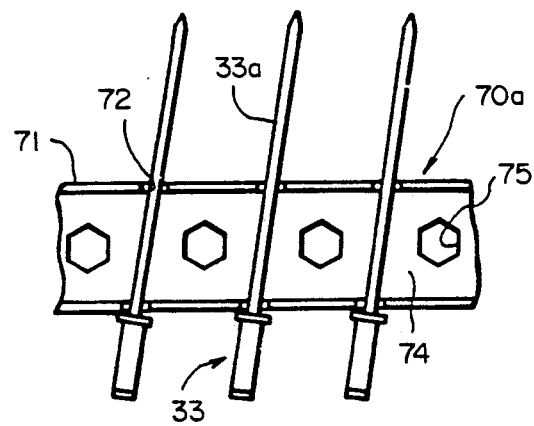

FIG. 1 (a) to (c) illustrate a first embodiment according to the present invention.

A feed belt 70 is made of plastic material in channel form. A series of slits 72 are formed on both edges at a determined distance and a series of feeder slots 75 are formed on a bottom thereof 74 at the above determined distance. A rod portion 33a of a rivet is inserted into the bottom of the slits 72 so as to be slided when needed.

FIGS. 4 to 7 show a continuous riveter which can be loaded with the feed belt 70. The riveter comprises a riveter head A, a driver B and a rivet feeding device C as shown in FIG. 4.

The driver B comprises an oil pump 12 of small diameter and a pneumatic cylinder 1 of large diameter. A piston rod 3 of a piston 2 in the pneumatic cylinder 1 is inserted into an oil pump cylinder 12a. A connector 40 and a valve chamber 44 are connected to a valve rod guide 41 and located in the lower portion of the pneumatic cylinder 1. The large diameter portions of rod guide 41 are connected to the front and rear portions of pneumatic cylinder 1 provided with front and rear orifices 42 and 43 respectively. A valve rod 6 is slidably inserted into the rod guide 41. The rear end of a valve rod 6 abuts on a rear valve 8 and the front end thereof closes the guide 41. Numerals 25 and 26 show valve springs for advancing the valve 8 and the valve rod 6. A trigger 9, an arm 10 and a connecting rod 11 are articulated with pin 45, 46, 47 and 48 in the lower portion of oil pump cylinder 12. The other end of arm 10 abuts on the front end of valve rod 6.

A cylindrical riveter nose 18 is connected to the lower portion of a lift cylinder 5 incorporated with the cylinder 12. A piston 13 is inserted into the lift cylinder 5 and normally kept in the lowest position by means of a compression spring 27. The bottom of lift cylinder 5 is connected to the cylinder 12.

A chuck 14 is fixed on the lower portion of a piston rod 13a with a pin 49. A pair of jaws 14a are pressed on the inner wall of nose 18 by means of compression spring 28 so as to slide on. A pair of nose piece 19 are pivoted on the lower portion of the riveter nose 18 with pins 50 of which lower ends are pushed inward by springs 29 externally inserted on screw 51. A taperd portion 52 is formed on the inner wall of nose 18. Numeral 53 shows a slot for receiving said feed belt 70.

Figure 6:
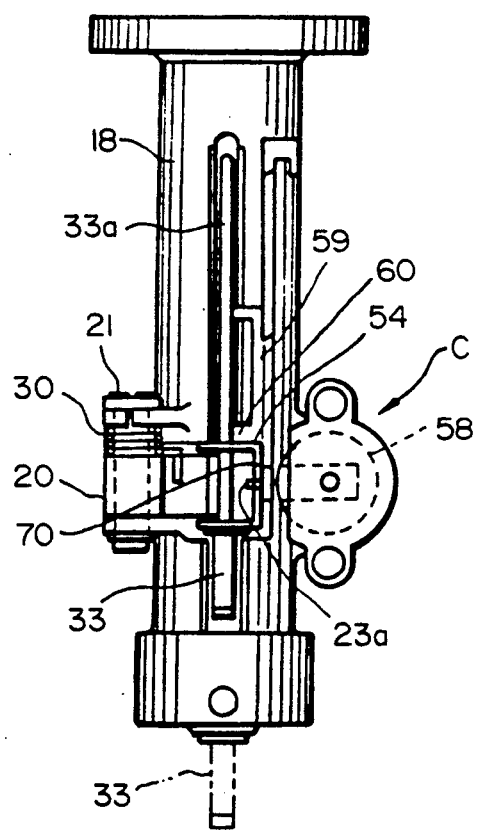
FIG. 6 shows a partial rear view of riveter head loaded with a feed belt according to the present invention.
Figure 7:
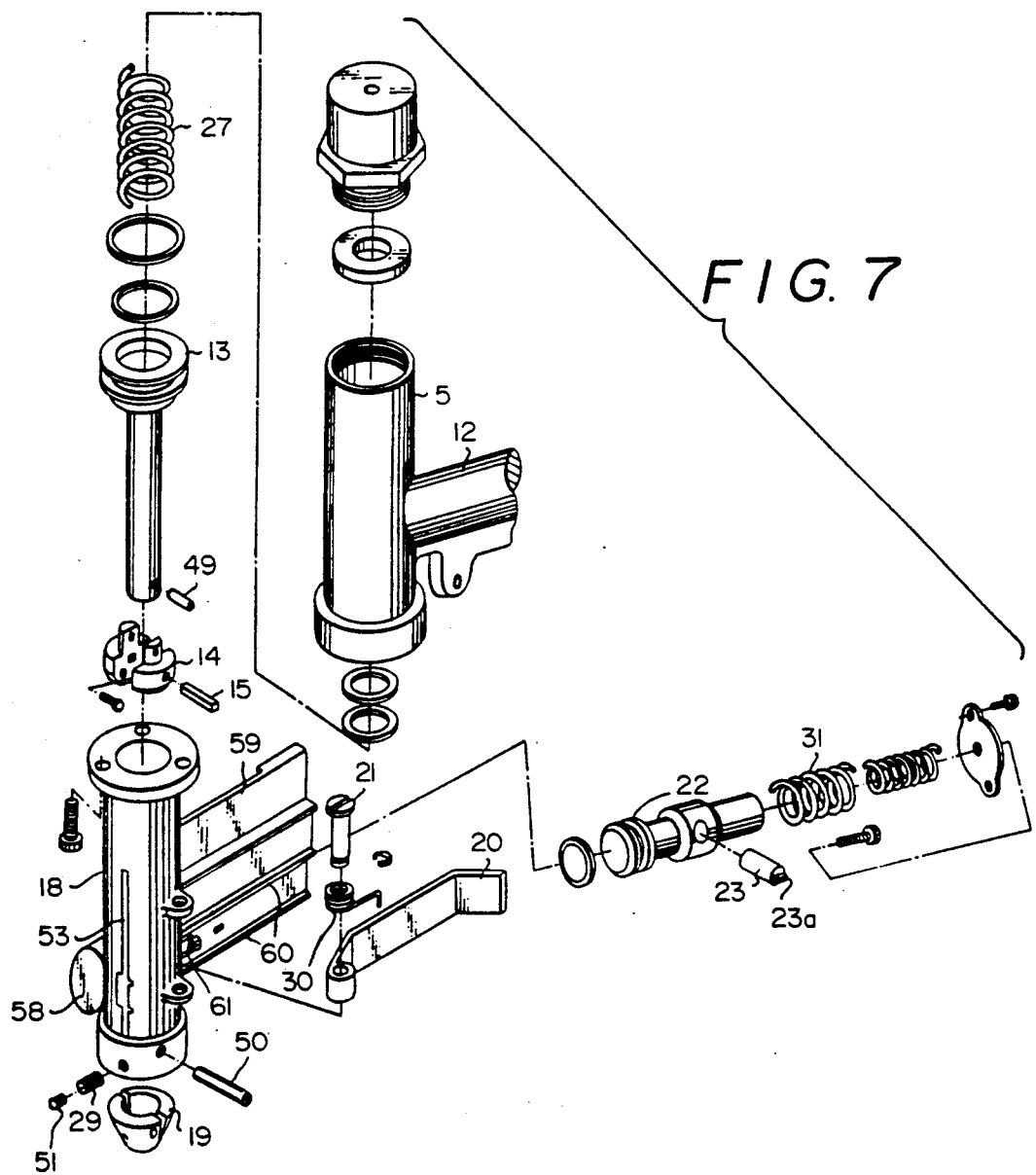
FIG. 7 illustrates an exploded view of a riveter head.

A rivet feeding device C shown in FIG. 4 comprises an air cylinder 58 and a guide plate 59 mounted on the side of riveter nose 18. A piston 22 is mounted in an air cylinder 58 so as to be advanced by spring 31, wherein a pin 23 provided with a pawl 23a is fit in a piston rod 22a as shown in FIGS. 6 and 7. Further, the cylinder 58 is connected to the cylinder 1 with connecting pipe not illustrated.

A pair of guide ribs 60 for guiding the feed belt 70 are formed on the side of guide plate 59 and a slot 61 wherein the pawl 23a reciprocates is formed longitudinally between the ribs 60. Numeral 20 indicates a clip for feed belt 70 pivoted on the side of nose 18 and pressed onto the guide plate 59 by a spring 30. Also numeral 34 indicates a feed belt holder.

Hereinafter, the function of this riveter will be explained.

After connecting the connector 40 to a compressed air source, not illustrated, when the trigger 9 is pulled, the valve arm 10 pushes the front end of valve rod 6 to open the air valve 8. Accordingly, compressed air penetrates into the air cylinder 1 through the rear orifice 43 so as to push the piston 2. Accordingly, oil in the pump cylinder 12a penetrates into a cylinder 5a of riveter head A so as to lift the piston 13. At that moment, compressed air is fed into the air cylinder 58 of rivet feeding device C and the piston 22 moves to the right, accordingly the pawl 23a is engaged with the next feeder slot 75 of the feed belt 70.

When the trigger 9 is released, by means of return springs 26 and 25, the arm 10 retreats and the valve 8 closes to shut off compressed air. Then the piston 22 moves to the left by means of spring 31 and one stroke length of feed belt 70 is advanced, accordingly a next rivet 33 is loaded into the nose 18.

Then the piston 13 of lift cylinder descends by means of compression spring 27 and when the chuck 14 closes passing the tapered portion 52 of inner wall, the rod 33a of the rivet 33 can be grabbed.

Consequently, the rivet 33 continues to descend together with chuck until the flange portion of rivet 33 pass through a pair of nose pieces by opening the nose pieces 19. Then it stops to descend sticking out of the nose pieces so as to be inserted in through holes 63 formed on sheet metals.

When the trigger 9 is pulled again, the piston 13 of lift cylinder 5 rises and then the rod portion 33a of rivet 33 is pulled up to complete the riveting operation. Next, the rod portion 33a is torn off and still continues to rise. When the chuck passes the tapered portion 52, the chuck opens releasing the rod portion 33a in the slits 72 of feed belt 70. Then the piston 22 returns to the right and the pawl 23a returns to the right end of slot 61.

By repeating the above operation, the riveting operatin can be executed and the rod portion 33a of used rivet is ejected together with feed belt through the slot 53 one by one.

When this type of feed belt 70 is used, rivets can be loaded automatically improving productivity and used rod portions 33a can be prevented from dispersing because of the feed belt.

Figure 2A:
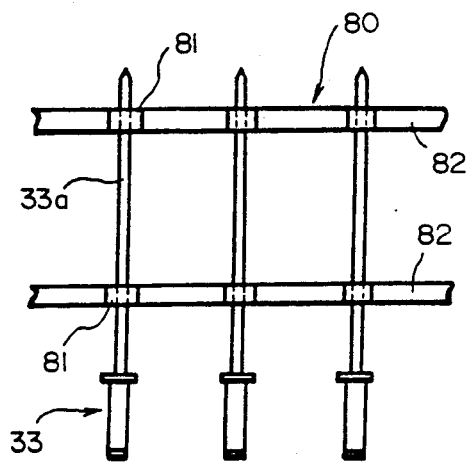
FIG. 2 (a) shows a plan view of an other embodiment.
Figure 2B:
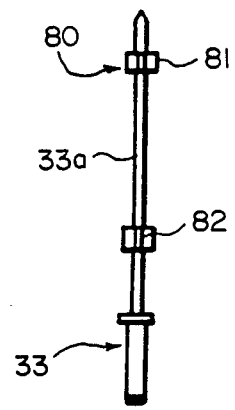
Figure 2C:
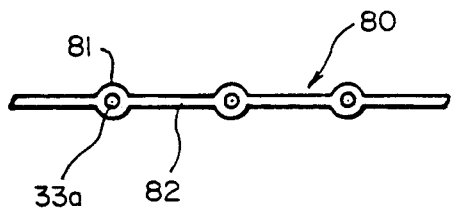

FIGS. 2 (a) to (c) show other embodiment according to the present invention. A pair of feed belts 80 comprises a pair of tapes, upper and lower, made of plastic material in parallel wherein a series of through holes are formed transversely at a determined distance and the rod portions 33a of rivet 33 are inserted therein so as to be slidable transversely.

In this case, the feeder slots 75 do not exist, but the feeder pawl abuts on the rod portions 33a between the upper and lower tape so as to drive the feed belt intermittently. Further, operations are identical to those of said feed belt 70.

Figure 3C:
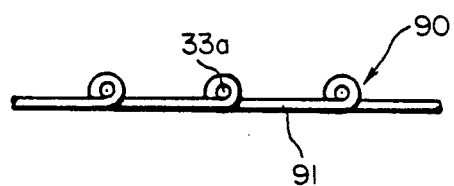
FIG. 3 (a) shows a plan view of an other embodiment.
Figure 3A:
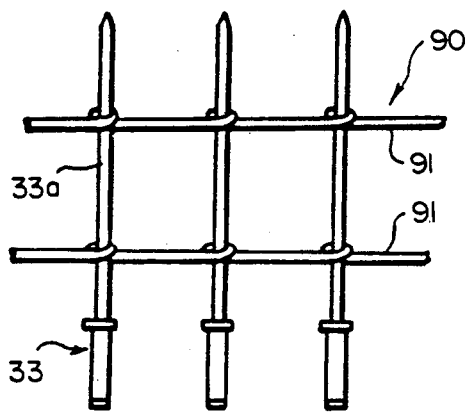
Figure 3B:
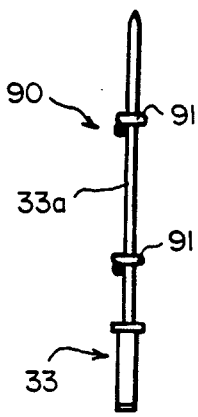
Figure 5:
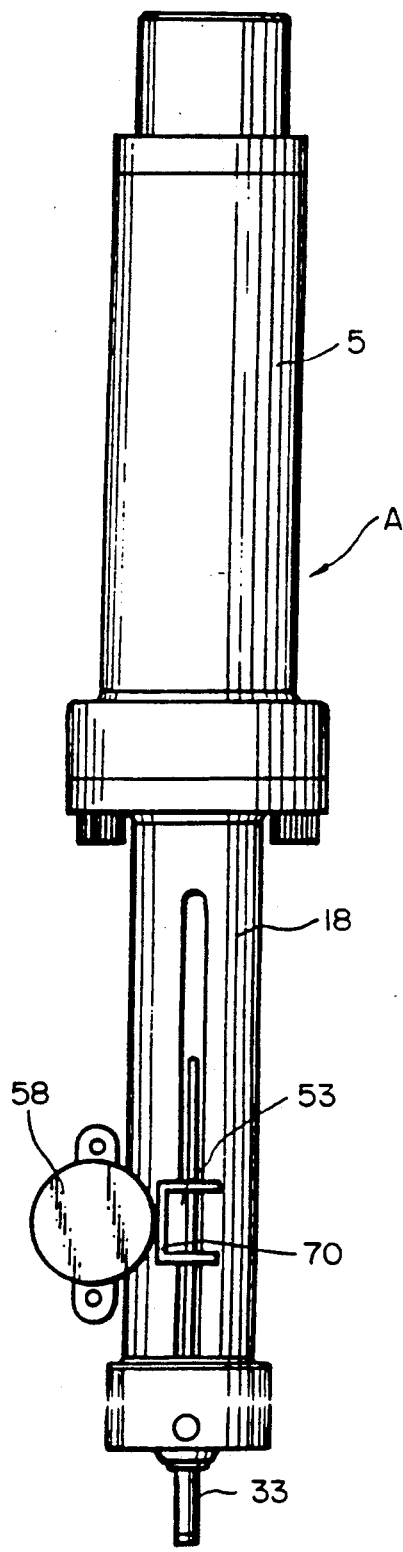
FIG. 5 shows a partial front view of the riveter head loaded with a feed belt according to the present invention.

FIGS. 3 (a) to (c) show an other embodiment according to the present invention. A feed belt 90 comprises a pair of chains 91, upper and lower, with one turn winding on rod portion 33a of rivet 33 at a determined distance so as to be transversely slidable therein.

In this case, the feeder slots 75 do not exist too, but rivets can be fed as well as by the feed belt 80.

Rivets are inserted transversely into the feed belt 80 and 90, but they may be inserted diagonally into feed belt as shown in FIG. 1 (d), which can be used in riveter of which the nose is inclined more than that shown in FIG. 4 so that it may be used in limited space such as in a corner.

By using this type of rivet feed belt, a riveting operation can be executed more efficiently substituting an one-by-one loading operation with an automatic loading operation.

What is claimed is:

1. A feed belt for blind rivets characterized by comprising a series of supporting means formed on said feed belt at a determined distance for supporting a blind rivet rod, a series of driven means formed on said feed belt at a determined distance so as to engage with a driving pawl of a continuous riveter, and a plurality of blind rivets inserted into said supporting means wherein said series of supporting means for blind rivets comprises a series of elongated slits with linear sides formed on continuous edges of a channel made of plastic material at a determined distance.

2. A feed belt according to claim 1, wherein said series of supporting means are formed to support the rivets transversely between said edges of said plastic channel.

3. A feed belt according to claim 1, wherein said series of supporting means is formed to support the rivets diagonally between said edges of said plastic channel.

4. A feed belt as claimed in claim 1 in combination with a power driven riveter having a reciprocatory driving pawl for advancing the feed belt and wherein the driven means comprise openings in a base portion of the channel spaced at distances conforming with strokes of the pawl.

* * * * *